Dec. 17, 1935.  L. T. PETIT  2,024,595
FURNACE STRUCTURE
Filed Jan. 31, 1935  2 Sheets-Sheet 1
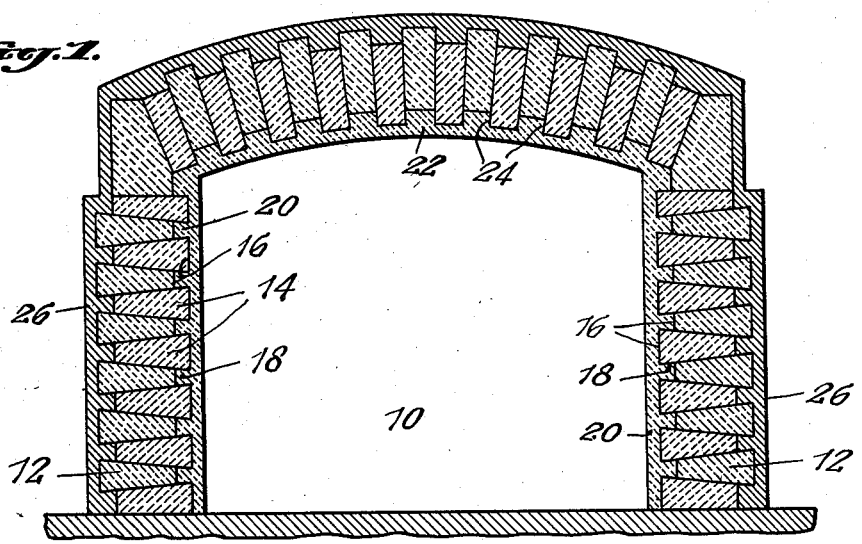
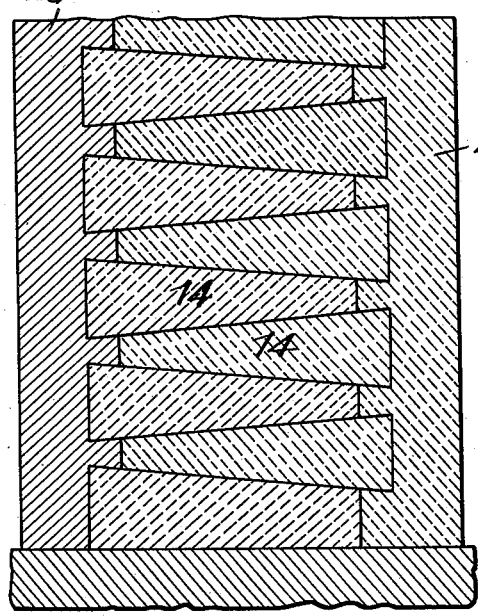
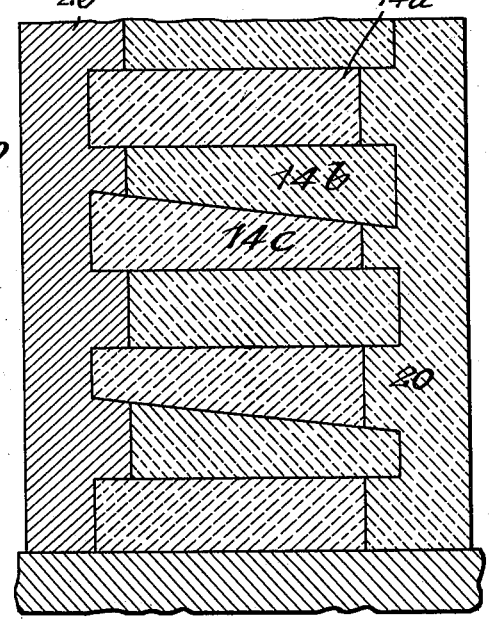
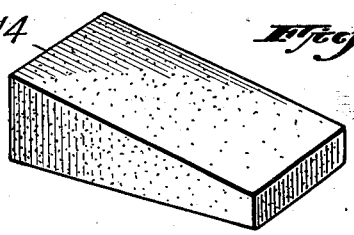
INVENTOR.
LEON T. PETIT.
BY
ATTORNEYS Dec. 17, 1935.  L. T. PETIT  2,024,595
FURNACE STRUCTURE
Filed Jan. 31, 1935  2 Sheets-Sheet 2
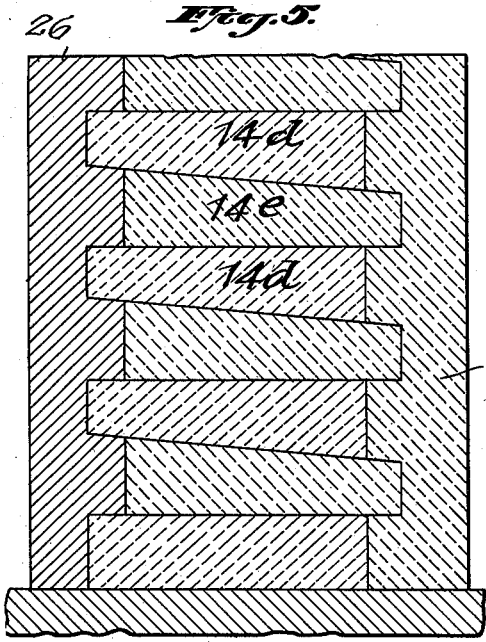
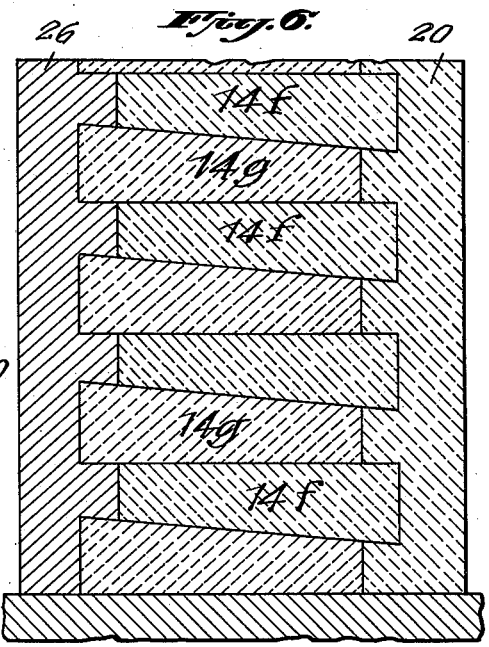
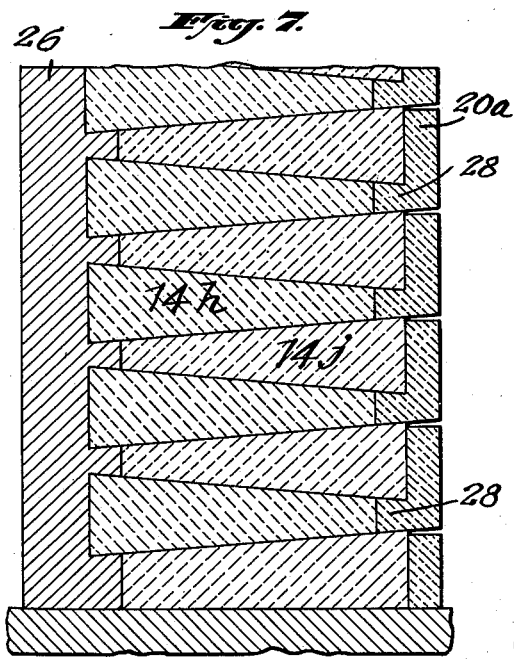
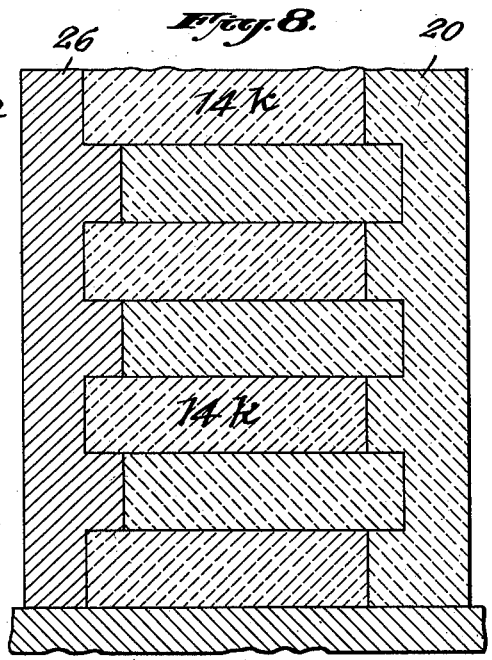
INVENTOR.
LEON T. PETIT.
BY
ATTORNEYS

Patented Dec. 17, 1935

2,024,595

UNITED STATES PATENT OFFICE 2,024,595

FURNACE STRUCTURE

Leon T. Petit, Pittsburg, Calif.

Application January 31, 1935, Serial No. 4,381

4 Claims. (Cl. 263—46)

This invention relates to improvements in furnaces and aims to provide a structure of brickwork having a lining interlocked therewith, which lining is adapted to resist attack by basic substances. While not limited thereto, furnace wall structure of my invention is particularly well suited for incorporation in open hearth furnaces. It is known to those skilled in the art that the end walls of such open hearth furnaces are frequently made of silica or acid brick. Such brick has usually been regarded as a necessity, as it is the only brick capable of withstanding the necessary loads at the elevated temperature at which these furnaces are usually worked.

The waste gases passing from the hearth in the outgoing ends of open hearth furnaces contain large amounts of finely divided basic substances, such as iron oxides, lime dust, etc. When such basic substances impinge on the hot silica brick walls, low fusing point salts are formed which cause a rapid wearing away or erosion of the acid refractories.

It is possible to install basic or neutral refractories in the nature of panels or bulk heads at the points of greatest erosion so as to reduce the above-mentioned wearing away of the acid refractories, but it is not generally regarded as feasible to build an entire wall of basic refractory material as such basic refractories will not withstand the loads which are met in practice. Moreover, the cost of a furnace wall made entirely of a basic refractory would be practically prohibitive and the heat losses would be inordinately high because of the thermal conductivity of such basic materials.

My invention makes it feasible to combine silica brick walls or ordinary fire brick or clay brick walls with a protective lining which is characterized by a high degree of resistance to attack by the basic substances carried in the outgoing gases leaving the port at the end of the furnace.

Various alternative embodiments of the invention are illustrated in the accompanying drawings and referred to in detail in the following specification.

In the drawings—

Fig. 1 is a cross section through a furnace having side walls and a roof embodying the invention; Fig. 2 is a vertical section on an enlarged scale of a portion of the wall shown in Fig. 1; Fig. 3 is a perspective view of one form of brick which can conveniently be used in building up the wall constituting part of the body of the furnace wall; Figs. 4 to 8 inclusive are vertical sectional views of alternative embodiments of the invention.

Referring in detail to the drawings, 10 represents a cross section through the furnace which may be regarded by way of example as an open hearth furnace. The side walls 12—12 of this furnace are built up of substantially wedge-shaped bricks 14 whose inner faces 16 are offset in different vertical planes so as to provide pockets 18. These pockets serve as a means for interlocking with the brick wall a lining 20 which is preferably formed of a neutral or basic refractory substance. Such substance is characterized by a resistance to attack by basic substances when highly heated. Various mixtures may be employed for the lining material such as combinations of chrome ore with lime and sand or magnesite with chrome ore and various high temperature cements. Chromite when used alone or with lime and/or sand has a shrinking characteristic. Magnesia has an expanding characteristic. By proper combination of chrome and magnesia, a series of compounds can be formed of various degrees of fusion with either expanding, contracting, or substantially no coefficient of expansion characteristics. The same sort of lining may be used, as indicated at 22, for the roof portion of the furnace, in which case the silica or other bricks will also be laid up in such a way so as to form pockets 24.

In some cases, I will also provide an outer layer of heat insulation material, such as indicated at 26 and when the silica or other bricks are laid up in the manner illustrated it should be appreciated that pockets would be provided which also facilitate the interlocking of the outer insulating layer with the brick wall and roof.

The brick work of the side walls shown in Figs. 1 and 2 constitutes a multiplicity of similar bricks, each of wedge shape, the inner and outer faces of some of the brick being offset with respect to the bricks with which they contact. This relationship forms undercut pockets which provide for a dove-tail interlocked connection between the bricks and the inner lining 20 and the outer insulation 26.

In the modification of Fig. 4, the body of the wall is made up of a number of ordinary rectangular prismatic bricks 14ᵃ and wedge-like bricks 14ᵇ and 14ᶜ, whose inclined faces contact one another and whose square faces contact the bricks 14ᵃ. This arrangement also provides pockets which facilitate the interlocking of the lining 20 and the outer insulation 26. A similar arrangement is shown in Fig. 5, except that substantially all of the bricks are of wedge-like form, the bricks for example shown at 14ᵈ having upper faces which are square and lower faces which are inclined and the bricks 14ᵉ having lower faces which are square and upper faces which are inclined, the lowest brick being of rectangular prismatic form.

In the modification of Fig. 6, the lowest brick has a horizontal lower face and an inclined upper face and a series of alternate bricks 14ᶠ have their lower inclined faces and upper square or horizontal faces. The intermediate bricks 14ᵍ have upper inclined faces and lower square or horizontal faces.

In the modification of Fig. 7, the bricks 14ʰ and 14ʲ have both their upper and lower faces inclined and their inner faces are so offset with respect to one another as to provide dovetail or uncut pockets. These pockets are adapted to receive the projections 28, which are formed integral with and extend laterally from the lining bricks 20ᵃ. These lining bricks are made of special neutral or basic materials, which have a materially greater resistance to attack by basic substances when highly heated than that of the silica or other brick used for the main body of the supporting wall.

In some cases, instead of using wedge-like or tapered brick for the main body or wall, I may employ ordinary brick of the usual rectangular prismatic form as shown at 14ᵏ in Fig. 8, it being regarded important, however, to offset the inner faces of some of the bricks from the inner faces of others so as to provide the pocketed arrangement for keying or interlocking the lining material 20 with the body of the wall.

While the drawings show walls made up of bricks which are all of equal length as measured transversely of the wall so as to provide pockets on both the inner and outer sides it will be apparent that, if desired, bricks of uneven length may be used so as to give a smooth exterior to the wall. However, in most cases, it is desirable to insulate the walls on the outside hence the pockets on the exterior will serve to retain the insulation.

Heretofore, when smooth sided walls have been used, it has usually been necessary to provide nails, wire netting, or equivalent anchorage means for holding the insulation.

While I have described in detail various embodiments of the invention herein illustrated, it is to be understood that the drawings and descriptions are to be interpreted in an illustrative rather than a limiting sense since various modifications may be made by those skilled in the art without departure from the invention as defined in the appended claims.

What I claim is:—

1. In a furnace structure, a body of brickwork in which some of the bricks have faces inclined with relation to their opposite faces and the inner faces of some of the bricks being offset from others so as to provide inner undercut pockets, and an inner lining, of material characterized by its resistance to attack by basic substances when highly heated, interlocked with said pockets.

2. In a furnace structure, a body of brickwork in which some of the bricks have faces inclined with relation to their opposite faces and the inner faces of some of the bricks being offset from others so as to provide inner undercut pockets, and inner lining bricks having projections which engage said pockets, said lining bricks being of a material having a higher resistance to attack by basic substances when highly heated than that of said body of brickwork.

3. In a furnace structure, a load supporting wall comprising a body of silica brickwork in which the inner faces of some of the bricks are offset from others to provide pockets, a continuous unbroken inner lining interlocked with the pockets formed of a material characterized by its resistance to attack by basic substances when highly heated.

4. In a furnace structure, a load supporting wall comprising a body of brickwork having relatively low resistance to attack by basic substances, some of the bricks thereof being offset from others to provide pockets, an unbroken inner lining of substantially less thickness than that of the wall and formed of material characterized by a high resistance to attack by basic substances when highly heated.

LEON T. PETIT.